(12) United States Patent
Hong

(10) Patent No.: US 11,395,172 B2
(45) Date of Patent: Jul. 19, 2022

(54) METHOD AND APPARATUS FOR CONFIGURING MEASUREMENT

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 4 days.

(21) Appl. No.: 16/967,725

(22) PCT Filed: Feb. 6, 2018

(86) PCT No.: PCT/CN2018/075405
§ 371 (c)(1),
(2) Date: Aug. 5, 2020

(87) PCT Pub. No.: WO2019/153117
PCT Pub. Date: Aug. 15, 2019

(65) Prior Publication Data
US 2021/0044998 A1   Feb. 11, 2021

(51) Int. Cl.
*H04W 24/10* (2009.01)
*H04W 4/80* (2018.01)

(52) U.S. Cl.
CPC ............. *H04W 24/10* (2013.01); *H04W 4/80* (2018.02)

(58) Field of Classification Search
CPC ............................. H04W 24/10; H04W 24/08
See application file for complete search history.

(56) References Cited

U.S. PATENT DOCUMENTS

| 9,973,954 B2* | 5/2018 | Johansson ............. H04W 24/10 |
| 2014/0087716 A1 | 3/2014 | Vaderna |

(Continued)

FOREIGN PATENT DOCUMENTS

| CN | 102333329 A | 1/2012 |
| CN | 102457840 A | 5/2012 |

(Continued)

OTHER PUBLICATIONS

Third Office Action and Search Report Issued in Chinese Application No. 201880000136.9, dated May 24, 2021, with English translation, (24p).

(Continued)

*Primary Examiner* — Kevin Kim
(74) *Attorney, Agent, or Firm* — Arch & Lake LLP

(57) ABSTRACT

The present disclosure provides a method and apparatus for configuring measurement. The method applied to a base station includes: configuring a terminal with a measurement event for performing a minimization of drive test (MDT) on a designated network device and a trigger condition for the measurement event; generating first configuration information, where the first configuration information represents the trigger condition for the measurement event; adding the first configuration information to a designated signaling; and transmitting the designated signaling to the terminal, the designated signaling to the terminal instructs the terminal to perform the MDT on the designated network device and obtain a measurement result of the MDT, and in response to a determination that the measurement result of the MDT satisfies the trigger condition for the measurement event, receiving the measurement result of the MDT from the base station.

18 Claims, 10 Drawing Sheets

(56) References Cited

U.S. PATENT DOCUMENTS

| | | | | |
|---|---|---|---|---|
| 2014/0228017 | A1* | 8/2014 | Chang | H04W 24/10 455/422.1 |
| 2015/0312850 | A1 | 10/2015 | Li et al. | |

FOREIGN PATENT DOCUMENTS

| | | | |
|---|---|---|---|
| CN | 102547840 | A | 7/2012 |
| CN | 104853432 | A | 8/2015 |
| CN | 104904286 | A | 9/2015 |
| CN | 105900475 | A | 8/2016 |
| CN | 106899988 | A | 6/2017 |
| CN | 103535065 | B | 11/2017 |
| EP | 2704471 | A2 | 3/2014 |
| WO | 2012136245 | A1 | 10/2012 |
| WO | 2013166709 | A1 | 11/2013 |
| WO | 2014094309 | A1 | 6/2014 |
| WO | 2014106347 | A1 | 7/2014 |

OTHER PUBLICATIONS

International Search Report issued in Application No. PCT/CN2018/075405 dated Oct. 10, 2018, (4p).

First Office issued in Chinese Application No. 201880000136.9 dated Apr. 9, 2020 with English translation, (22p).

European Patent Office, Extended European Search Report Issued in Application No. 18904573.5, dated Jan. 28, 2021, Germany, 13 pages.

CMCC, "Introduction of new measurement collection in MDT",3GPP TSG-RAN WG2 Meeting #100,Reno, Nevada, USA,R2-1713259, Nov. 27-Dec. 1, 2017, 76 pages.

CMCC, Nokia, Xiaomi, OPPO, "New WID: Bluetooth/WLAN measurement collection in MDT",3GPP TSG RAN Meeting #78, Lisbon, Portugal, RP-172820, Dec. 18-21, 2017, 4 pages.

ISA State Intellectual Property Office of the People's Republic of China, Written Opinion of the International Searching Authority Issued in Application No. PCT/CN2018/075405, dated Oct. 10, 2018, WIPO, 9 pages.

3rd Generation Partnership Project;Technical Specification Group Radio Access Network;Universal Terrestrial Radio Access (UTRA) and Evolved Universal Terrestrial Radio Access (E-UTRA);Radio measurement collection for Minimization of Drive Tests (MDT); Overall description; Stage 2 (Release 14),3GPP TS 37.320 V14.0.0, Mar. 2017, 26 pages.

Intellectual Property India, First Office Action Issued in Application No. 202047037707, dated Nov. 25, 2021, with partial machine translation (7p).

\* cited by examiner

METHOD AND APPARATUS FOR CONFIGURING MEASUREMENT

CROSS REFERENCE TO RELATED APPLICATIONS

This application is a national phase application based on PCT/CN2018/075405, filed Feb. 6, 2018, the content of which is incorporated herein by reference.

TECHNICAL FIELD

The present disclosure relates to the field of communication technologies, and in particular, to a method and apparatus for configuring measurement.

BACKGROUND

A drive test can reflect a state of a network, provide direct measurement and evaluation on a network performance indicator, and identify a problem of the network. In the related art, traditional network optimization is based on data of the drive tests, which is network data such as voltage level and quality collected by a drive test instrument. Such data is analyzed to find the problem of the network, and then optimize the network for a problem area. However, the traditional network optimization often requires a lot of manpower, material resources, and capital investment, and also has very high experience requirements for network optimization personnel.

SUMMARY

To overcome the defects in the related art, examples of the present disclosure provide a method and an apparatus for configuring measurement.

According to a first aspect the present disclosure, a method of configuring measurement is provided. The method includes:

configuring, by a base station, a terminal with a measurement event for performing a minimization of drive test (MDT) on a designated network device and a trigger condition for the measurement event;

generating, by a base station, first configuration information, where the first configuration information represents the trigger condition for the measurement event;

adding, by a base station, the first configuration information to a designated signaling; and transmitting, by a base station, the designated signaling to the terminal, the designated signaling to the terminal instructs the terminal to perform the MDT on the designated network device and obtain a measurement result of the MDT, and in response to a determination that the measurement result of the MDT satisfies the trigger condition for the measurement event, receiving, by the terminal, the measurement result of the MDT from the base station.

According to a second aspect of the present disclosure, a method of configuring measurement is provided. The method includes:

receiving, by a terminal, a designated signaling from a base station, where the designated signaling includes first configuration information, and the first configuration information represents a trigger condition for a measurement event configured by the base station for the terminal to perform an MDT on a designated network device;

obtaining, by a terminal, the first configuration information from the designated signaling;

determining, by a terminal, the trigger condition for the measurement event configured by the base station for the terminal based on the first configuration information;

performing, by a terminal, the MDT on the designated network device and obtaining a measurement result of the MDT; and in response to determining that the measurement result of the MDT satisfies the trigger condition for the measurement event, reporting, by a terminal, the measurement result of the MDT to the base station.

According to a third aspect of the present disclosure, a base station is provided. The base station includes: a processor; a non-transitory storage coupled to the processor; and a plurality of programs stored in the non-transitory storage that, when executed by the processor, cause the base station to perform acts comprising: configuring a terminal with a measurement event for performing a minimization of drive test (MDT) on a designated network device and a trigger condition for the measurement event; generating first configuration information, wherein the first configuration information represents the trigger condition for the measurement event; adding, by the base station, the first configuration information to a designated signaling; and transmitting the designated signaling to the terminal, the designated signaling to the terminal instructs the terminal to perform the MDT on the designated network device and obtain a measurement result of the MDT. The terminal reports the measurement result of the MDT to the base station in response to a determination that a measurement result of the MDT satisfies the trigger condition for the measurement event.

According to a fourth aspect of the examples of the present disclosure, a terminal is provided. The terminal includes: a processor; a non-transitory storage coupled to the processor; and a plurality of programs stored in the non-transitory storage that, when executed by the processor, cause the terminal to perform acts comprising: receiving, by a terminal, a designated signaling from a base station, wherein the designated signaling comprises first configuration information, and the first configuration information represents a trigger condition for a measurement event configured by the base station for the terminal to perform an MDT on a designated network device; obtaining the first configuration information from the designated signaling; determining the trigger condition for the measurement event configured by the base station for the terminal based on the first configuration information; performing the MDT on the designated network device and obtaining a measurement result of the MDT; and in response to determining that the measurement result of the MDT satisfies the trigger condition for the measurement event, reporting the measurement result of the MDT to the base station.

According to a fifth aspect of the present disclosure, a non-transitory computer-readable storage medium is provided, the storage medium stores a computer program, where the computer program is configured to perform the method of configuring measurement according to the first aspect.

According to a sixth aspect of the examples of the present disclosure, a non-transitory computer-readable storage medium is provided, the storage medium stores a computer program, where the computer program is configured to perform the method of configuring measurement according to the second aspect.

The technical solutions provided by the examples of the present disclosure may include the following beneficial effects.

In the base station provided by the present disclosure, the terminal is configured with the measurement event for performing an MDT on a designated network device and a trigger condition for the measurement event; first configuration information is generated, where the first configuration information represents the trigger condition for the measurement event with respect to the designated network device; the first configuration information is added to a designated signaling; and the designated signaling is transmitted to the terminal. In this way, the terminal performs the MDT on the designated network device, and when a measurement result of the MDT satisfies the trigger condition for the measurement event with respect to the designated network device, the terminal can report the measurement result of the MDT to the base station. Therefore, for the designated network device indicated by the base station, the MDT is performed and the measurement result is report. Furthermore, efficiency of configuring measurement is improved.

In the terminal provided by the present disclosure, a designated signaling from the base station is received, where the designated signaling includes first configuration information represented a trigger condition for a measurement event which is configured by the base station for the terminal to perform an MDT on a designated network device; the first configuration information is obtained from the designated signaling; based on the first configuration information, the trigger condition for the measurement event which is configured by the base station for the terminal is determined; and when the MDT is performed on the designated network device and a measurement result of the MDT satisfies the trigger condition for the measurement event, the measurement result of the MDT is reported to the base station. In this way, for the designated network device, the MDT is performed and the measurement result is reported based on the configuration from the base station. Therefore, for the designated network device indicated by the base station, the MDT is performed and the measurement result is report. Furthermore, efficiency of configuring measurement is improved.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
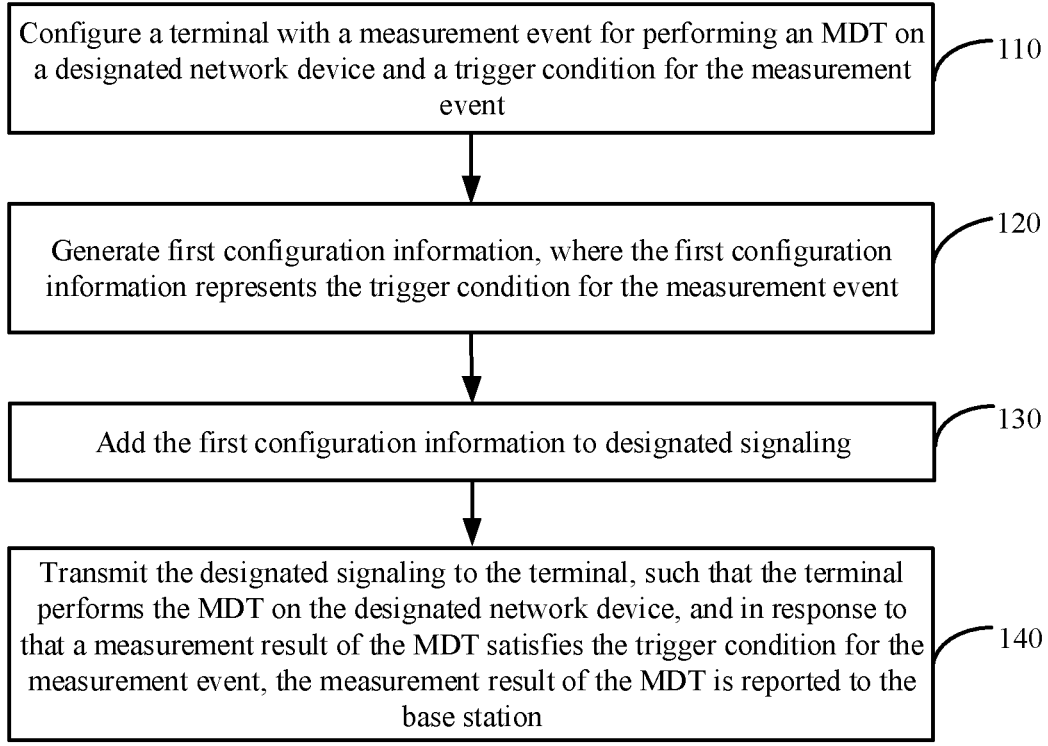
FIG. 1 is a flowchart illustrating a method of configuring measurement according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

DTs (Drive Tests) can reflect a state of a network, provide direct measurement and evaluation on a network performance indicator, and identify a problem of the network. In the related art, traditional network optimization is based on data of the drive tests, which is network data such as voltage level and quality collected by a drive test instrument. Such data is analyzed to find the problem of the network, and then optimize the network for a problem area. However, the traditional network optimization often requires a lot of manpower, material resources, and capital investment, and also has very high experience requirements for network optimization personnel.

MDTs (Minimization of Drive Tests) technology mainly obtains relevant parameters required for network optimization through a measurement report which is reported by a mobile phone.

To make MDT more effective, at present, MDT application scenarios mainly include coverage optimization, capacity optimization, mobile optimization, QoS (Quality of Service) guarantee, etc.

At present, the MDT technology is mainly used in outdoor scenarios. In outdoor scenarios, a terminal can rely on GPS (Global Positioning System) for accurate positioning and information reporting. However, with the development of mobile communication technology, more and more mobile communications and traffic are generated indoors, and there are more and more BT (Bluetooth) devices and WLAN (Wireless Local Area Network) devices deployed indoors. The traditional MDT technology faces some challenges.

However, in the existing MDT mechanism, there is no mechanism for performing an MDT dedicated to a BT device or a WLAN device.

In view of the above problem, the present disclosure provides a method of configuring measurement. In this method, a base station can first configure a terminal with a measurement event for performing an MDT on a designated network device (e.g., a BT device or a WLAN device), and a trigger condition for the measurement event. Then, first configuration information representing the trigger condition for the measurement event is generated, and the first configuration information is transmitted to the terminal through designated signaling. In this way, the terminal can achieve MDT implementing and reporting specifically for the BT device or the WLAN device based on the first configuration information, so that performing the MDT on the BT device or the WLAN device is possible.

The technical solutions provided by the examples of the present disclosure will be described below with reference to specific examples.

Figure 2:
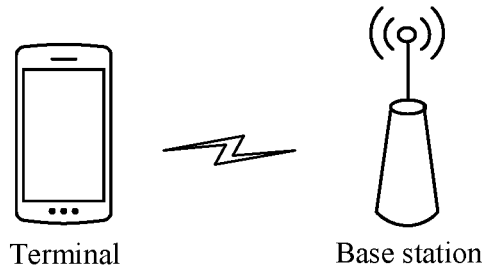
FIG. 2 is an application scenario diagram illustrating a method of configuring measurement according to an example.

FIG. 1 is a flowchart illustrating a method of configuring measurement according to an example, and FIG. 2 is an application scenario diagram illustrating a method of configuring measurement according to an example. The method of configuring measurement can be applied to a base station, and as shown in FIG. 1, the method of configuring measurement can include the following steps 110-140.

At step 110, a terminal is configured with a measurement event for performing an MDT on a designated network device and a trigger condition for the measurement event.

In the examples of the present disclosure, for an MDT based on a designated network device, the base station can define a new measurement event and a trigger condition for the new measurement event.

The designated network device can be a BT device and/or a WLAN device, so that the base station can define a new measurement event for the BT device and/or the WLAN device, and a trigger condition for the new measurement event.

In an example, the designated network device can be a BT device, and the base station can define two new measurement events for an MDT based on the BT device, such as, a first measurement event (T1) and a second measurement event (T2). A trigger condition for the first measurement event (T1) is that BT signal strength is larger than a first threshold (threshold 1); and a trigger condition for the second measurement event (T2) is that the BT signal strength is smaller than a second threshold (threshold 2). The first measurement event (T1) may represent that signal quality of the BT device is good, and the second measurement event (T2) may represent that the signal quality of the BT device is poor.

In an example, the trigger condition for the first measurement event (T1) can further include that duration of the BT signal strength being larger than the first threshold is first time (time 1), and the trigger condition for the first measurement event (T1) can further include that duration of the BT signal strength being smaller than the second threshold is second time (time 2). Thus, the first measurement event (T1) may represent that the signal quality of the BT device is excellent, and the second measurement event (T2) may represent that the signal quality of the BT device is rather poor.

In an example, the designated network device can be a WLAN device, and the base station can define a new measurement event for an MDT based on the WLAN device, such as, a third measurement event (W3). A trigger condition for the third measurement event (W3) is that WLAN signal strength is smaller than a third threshold (threshold 3). The third measurement event (W3) may represent that signal quality of the WLAN device is rather poor.

At step 120, first configuration information is generated, where the first configuration information represents the trigger condition for the measurement event with respect to the designated network device.

In the examples of the present disclosure, the first configuration information can include a key value in the trigger condition.

For example, the designated network device may be a BT device, and the first configuration information can include the first threshold (threshold 1) and the second threshold, so that the terminal can determine, based on the first threshold (threshold 1), that the trigger condition for the first measurement event (T1) is the BT signal strength being larger than the first threshold (threshold 1), and determine, based on the second threshold (threshold 2), that the trigger condition for the second measurement event (T2) is the BT signal strength being smaller than the second threshold (threshold 2).

For another example, the designated network device may be a WLAN device, and the first configuration information can include the third threshold (threshold 3), so that the terminal can determine, based on the third threshold (threshold 3), that the trigger condition for the third measurement event (W3) is the WLAN signal strength being smaller than the third threshold (threshold 3).

At step 130, the first configuration information is added to designated signaling.

At step 140, the designated signaling is transmitted to the terminal, such that the terminal performs the MDT on the designated network device, and in response to that a measurement result of the MDT satisfies the trigger condition for the measurement event with respect to the designated network device, the measurement result of the MDT is reported to the base station.

In the examples of the present disclosure, the base station can transmit the first configuration information to the terminal through the designated signaling.

In an example, the designated signaling may be RRC (Radio Resource Control) signaling, that is, the base station adds the first configuration information to the RRC signaling, and then transmits the RRC signaling to the terminal, such that the terminal obtains the first configuration information from the RRC signaling.

In an example, the designated signaling may be reporting configuration inter-RAT (Radio Access Technology) signaling, that is, the base station adds the first configuration information to the reporting configuration inter-RAT signaling, and then transmits the reporting configuration inter-RAT signaling to the terminal, such that the terminal obtains the first configuration information from the reporting configuration inter-RAT signaling. The reporting configuration inter-RAT signaling is generally configured to transmit a configuration of measurement reporting.

In an example, the designated signaling can be measurement configuration RRC signaling, that is, the base station adds the first configuration information to the measurement configuration RRC signaling, and then transmits the measurement configuration RRC signaling to the terminal, so that the terminal obtains the first configuration information from the measurement configuration RRC signaling.

The measurement configuration RRC signaling is one of RRC signaling.

In an exemplary scenario, as shown in FIG. 2, a terminal and a base station are included. The base station can first configure the terminal with a measurement event for performing MDT on a designated network device (e.g., a BT device or a WLAN device), and a trigger condition for the measurement event. Then, the base station generates a first configuration information representing the trigger condition for the measurement event, and transmits the first configuration information to the terminal through designated signaling. In this way, the terminal can achieve MDT implementing and reporting specifically for the BT device or the WLAN device based on the first configuration information, so that performing the MDT on the BT device or the WLAN device is possible.

As seen from the above examples, the terminal is configured with a measurement event for performing an MDT on a designated network device and a trigger condition for the measurement event; first configuration information representing the trigger condition for the measurement event with respect to the designated network device is generated; the first configuration information is added to designated signaling; and the designated signaling is transmitted to the terminal. In this way, the terminal performs the MDT on the designated network device, and when a measurement result of the MDT satisfies the trigger condition for the measurement event with respect to the designated network device, the measurement result of the MDT can be reported to the base station. Therefore, for the designated network device indicated by the base station, the MDT is performed and the measurement result is report. Furthermore, efficiency of configuring measurement is improved.

In an example, at the above step 110, the designated network device includes a BT device. A measurement event for the BT device includes a first measurement event, and/or a second measurement event. A trigger condition for the first measurement event includes that BT signal strength is larger than a first threshold, and a trigger condition for the second measurement event includes that the BT signal strength is smaller than a second threshold.

Correspondingly, the first configuration information may include the first threshold and/or the second threshold. When step 130 is performed, the first threshold and/or the second threshold can be added to the designated signaling.

As seen from the above example, the designated network device can be a BT device, the trigger condition for the first measurement event is that the BT signal strength is larger than the first threshold, and the trigger condition for the second measurement event is that the BT signal strength is smaller than the second threshold. Thus, the terminal performs an MDT on the BT device, and when a measurement result of the MDT satisfies the trigger condition for the first measurement event and/or the trigger condition for the second measurement event, the terminal can report the measurement result of the MDT to the base station instead of reporting all measurement results of the MDTs to the base station, thereby improving efficiency of reporting the measurement result of the BT device and saving resource overhead.

In an example, at the above step 110, the designated network device includes a BT device. A measurement event for the BT device includes a first measurement event and/or a second measurement event. A trigger condition for the first measurement event includes that BT signal strength is larger than a first threshold, and a trigger condition for the second measurement event includes that the BT signal strength is smaller than a second threshold. In addition, the trigger condition for the first measurement event further includes that duration of the BT signal strength being larger than the first threshold is first time, and the trigger condition for the second measurement event further includes that duration of the BT signal strength being smaller than the second threshold is second time.

Correspondingly, the first configuration information can include the first threshold and the first time, and/or the second threshold and the second time. When step 130 is performed, the first threshold and the first time, and/or the second threshold and the second time are added to the designated signaling.

As seen from the above example, the designated network device can be a BT device. The trigger condition for the first measurement event is that the BT signal strength is larger than the first threshold while the duration of the BT signal strength being larger than the first threshold is the first time. The trigger condition for the second measurement event is that the BT signal strength is smaller than the second threshold while the duration of the BT signal strength being smaller than the second threshold is the second time. In this way, the terminal performs an MDT on the BT device, and when a measurement result of the MDT satisfies the trigger condition for the first measurement event and/or the trigger condition for the second measurement event, the terminal can report the measurement result of the MDT to the base station, thereby improving accuracy of reporting the measurement result.

In an example, at the above step 110, the designated network device may be a WLAN device. A measurement event for the WLAN device includes a third measurement event. A trigger condition for the third measurement event is that WLAN signal strength is smaller than a third threshold.

Correspondingly, the first configuration information can include the third threshold. When step 130 is performed, the third threshold can be added to the designated signaling.

As seen from the above example, the designated network device can be a WLAN device, and the trigger condition for the third measurement event is that the WLAN signal strength is smaller than the third threshold. Thus, the terminal can perform an MDT on the WLAN device, and when a measurement result of the MDT satisfies the third trigger condition for the measurement event, the terminal can report the measurement result of the MDT to the base station instead of reporting all measurement results of the MDTs to the base station, thereby improving efficiency of reporting the measurement result of the WLAN device and saving resource overhead.

Figure 3:
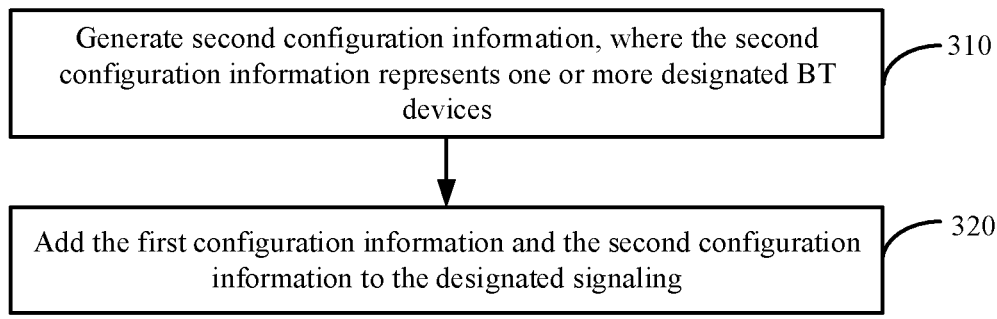
FIG. 3 is a flowchart illustrating another method of configuring measurement according to an example.

FIG. 3 is a flowchart illustrating another method of configuring measurement according to an example. On the basis of the method shown in FIG. 1, the method of configuring measurement can be applied to a base station, and the designated network device includes a BT device. A measurement event for the BT device includes a first measurement event and/or a second measurement event, a trigger condition for the first measurement event includes that BT signal strength is larger than a first threshold, and a trigger condition for the second measurement event includes that the BT signal strength is smaller than a second threshold. In addition, the trigger condition for the first measurement event further includes that duration of the BT signal strength being larger than the first threshold is first time, and the trigger condition for the second measurement event further includes that duration of the BT signal strength being smaller than the second threshold is second time. Moreover, the BT device includes one or more designated BT devices that the base station instructs the terminal to measure. As shown in FIG. 3, when step 130 is performed, the following steps 310-320 can be included.

At step 310, second configuration information is generated, where the second configuration information represents one or more designated BT devices that the base station instructs the terminal to measure.

In the example of the present disclosure, the second configuration information may include names of the one or more BT devices, and these names of the BT devices are used to represent which designated BT devices the base station instructs the terminal to measure.

Alternatively, the second configuration information may include a type of the BT device, and the type of the BT device is used to represent which designated BT device the base station instructs the terminal to measure, for example, a BT device associated with China Mobile.

In addition, if the base station instructs one or more designated BT devices that the terminal needs to measure, the terminal only performs an MDT on the one or more designated BT devices. If the base station does not instruct one or more designated BT devices that the terminal needs to measure, the terminal can perform the MDT on all BT devices which can be detected by the terminal.

At step 320, the first configuration information and/or the second configuration information is added to the designated signaling.

In the example of the present disclosure, the base station can transmit the first configuration information and/or the second configuration information to the terminal through the designated signaling.

In an example, the designated signaling may be the measurement configuration RRC signaling and the base station may also define new signaling for carrying the second configuration information, such as, BT measurement target signaling. In this case, the base station may first add the second configuration information to the BT measurement target signaling, and then add the first configuration information, and/or the BT measurement target signaling to the measurement configuration RRC signaling, and transmit the measurement configuration RRC signaling to the terminal. Thus, the terminal station can obtain the first configuration information and/or the BT measurement target signaling from the measurement configuration RRC signaling, and then obtain the second configuration information from the BT measurement target signaling.

The measurement configuration RRC signaling is generally configured to transmit a measurement parameter configured by the base station to the terminal, such as, a configuration of a measurement target, a configuration of measurement reporting, and so on.

As seen from the above example, the second configuration information is generated, where the second configuration information represents one or more designated BT devices that the base station instructs the terminal to measure, the first configuration information and the second configuration information are added to the designated signaling, and the designated signaling is transmitted to the terminal. In this way, the terminal can perform the MDT only on these designated BT devices, and when a measurement result of the MDT satisfies the trigger condition for the first measurement event and/or the trigger condition for the second measurement event, the terminal can report the measurement result of the MDT to the base station, thereby implementing the MDT and reporting the measurement result dedicated to the designated BT device instructed by the base station, and also improving accuracy of configuring measurement.

Figure 4:
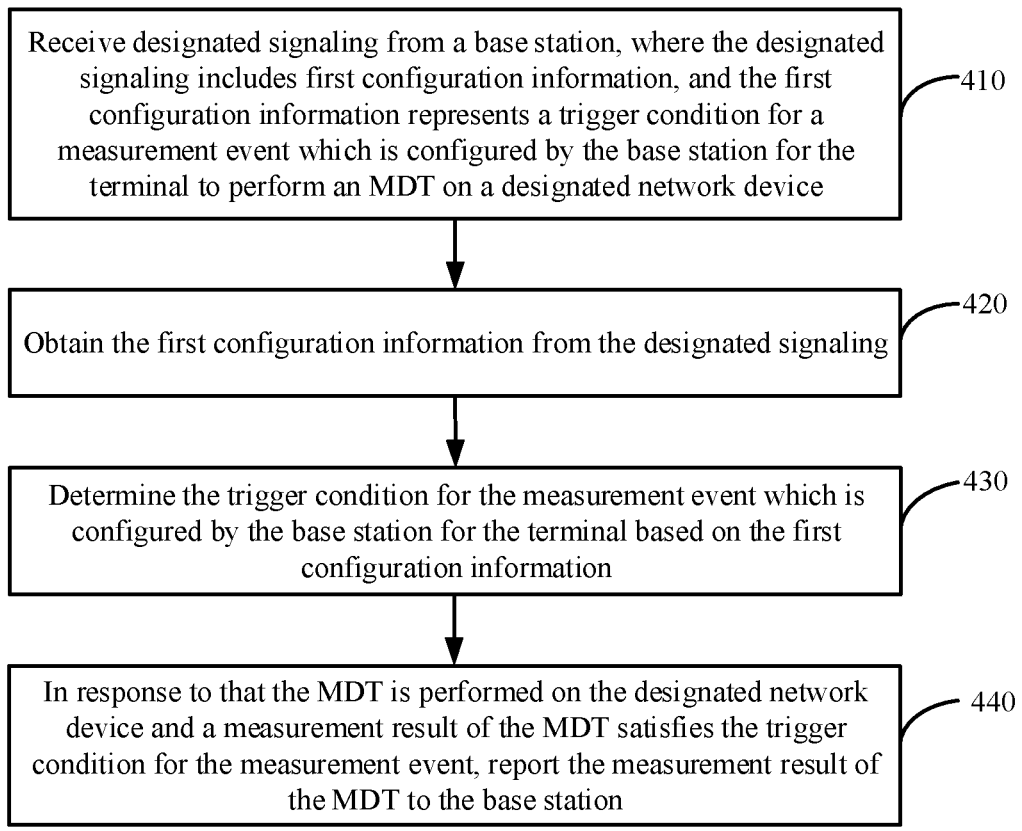
FIG. 4 is a flowchart illustrating a method of configuring measurement according to an example.

FIG. 4 is a flowchart illustrating a method of configuring measurement according to an example. The method of configuring measurement can be applied to a terminal. As shown in FIG. 4, the method of configuring measurement can include the following steps 410-440.

At step 410, designated signaling from a base station is received, where the designated signaling includes first configuration information, and the first configuration information represents a trigger condition for a measurement event which is configured by the base station for the terminal to perform an MDT on a designated network device.

In the examples of the present disclosure, the designated network device can be a BT device and/or a WLAN device; the trigger condition for the measurement event with respect to the designated network device can be a trigger condition for a measurement event with respect to the BT device and/or the WLAN device.

In an example, the designated network device can be a BT device, and the base station can define two new measurement events for an MDT based on the BT device, such as, a first measurement event (T1) and a second measurement event (T2). A trigger condition for the first measurement event (T1) is that BT signal strength is larger than a first threshold (threshold 1); and a trigger condition for the second measurement event (T2) is that the BT signal strength is smaller than a second threshold (threshold 2). The first measurement event (T1) may represent that signal quality of the BT device is good, and the second measurement event (T2) may represent that the signal quality of the BT device is poor.

In an example, the trigger condition for the first measurement event (T1) can further include that duration of the BT signal strength being larger than the first threshold is first time (time 1), and the trigger condition for the first measurement event (T1) can further include that duration of the BT signal strength being smaller than the second threshold is second time (time 2). Thus, the first measurement event (T1) may represent that the signal quality of the BT device is excellent, and the second measurement event (T2) may represent that the signal quality of the BT device is rather poor.

In an example, the designated network device can be a WLAN device, and the base station can define a new measurement event for an MDT based on the WLAN device, such as, a third measurement event (W3). A trigger condition for the third measurement event (W3) is that WLAN signal strength is smaller than a third threshold (threshold 3). The third measurement event (W3) may represent that signal quality of the WLAN device is rather poor.

At step 420, the first configuration information is obtained from the designated signaling.

In the example of the present disclosure, the designated signaling is signaling for transmitting the first configuration information.

In an example, the designated signaling may be RRC signaling, that is, the base station adds the first configuration information to the RRC signaling, and then transmits the RRC signaling to the terminal, such that the terminal can obtain the first configuration information from the RRC signaling.

In an example, the designated signaling may be reporting configuration inter-RAT signaling, that is, the base station adds the first configuration information to the reporting configuration inter-RAT signaling, and then transmits the reporting configuration inter-RAT signaling to the terminal, such that the terminal can obtain the first configuration information from the reporting configuration inter-RAT signaling. The reporting configuration inter-RAT signaling is generally configured to transmit a configuration of measurement reporting.

In an example, the designated signaling can be measurement configuration RRC signaling, that is, the base station adds the first configuration information to the measurement configuration RRC signaling, and then transmits the measurement configuration RRC signaling to the terminal, so that the terminal can obtain the first configuration information from the measurement configuration RRC signaling.

The measurement configuration RRC signaling is one of RRC signaling g.

At step 430, the trigger condition for the measurement event which is configured by the base station for the terminal is determined based on the first configuration information.

In the example of the present disclosure, the first configuration information can represent a trigger condition for a measurement event with respect to the BT device and/or the WLAN device.

For example, the designated network device may be a BT device, and the first configuration information can include the first threshold (threshold 1) and the second threshold, so that the terminal can determine, based on the first threshold (threshold 1), that the trigger condition for the first measurement event (T1) is the BT signal strength being larger than the first threshold (threshold 1), and determine, based on the second threshold (threshold 2), that the trigger condition for the second measurement event (T2) is the BT signal strength being smaller than the second threshold (threshold 2).

For another example, the designated network device may be a WLAN device, and the first configuration information can include the third threshold (threshold 3), so that the terminal can determine, based on the third threshold (threshold 3), that the trigger condition for the third measurement event (W3) is the WLAN signal strength being smaller than the third threshold (threshold 3).

At step 440, in response to that the MDT is performed on the designated network device and a measurement result of the MDT satisfies the trigger condition for the measurement event, the measurement result of the MDT is reported to the base station.

In the example of the present disclosure, the trigger condition for the measurement event can be a trigger condition for the terminal to report the measurement result.

For example, if the terminal detects a BT device, the terminal can perform the MDT on the BT device to obtain the measurement result of the MDT. If the measurement result of the MDT satisfies the trigger condition for the measurement event with respect to the BT device, the measurement result of the MDT satisfying the condition is reported to the base station.

As seen from the above example, a designated signaling from the base station is received, where the designated signaling includes first configuration information, and the first configuration information represents a trigger condition for a measurement event which is configured by the base station for the terminal to perform an MDT on a designated network device, the first configuration information is obtained from the designated signaling, and the trigger condition for the measurement event which is configured by the base station for the terminal is determined based on the first configuration information. In response to that an MDT is performed on the designated network device and a measurement result of the MDT satisfies the trigger condition for the measurement event, the measurement result of the MDT is reported to the base station. In this way, for the designated network device, the MDT is performed and the measurement result is reported based on the configuration from the base station. Therefore, for the designated network device indicated by the base station, the MDT is performed and the measurement result is report. Furthermore, efficiency of configuring measurement is improved.

Figure 5:
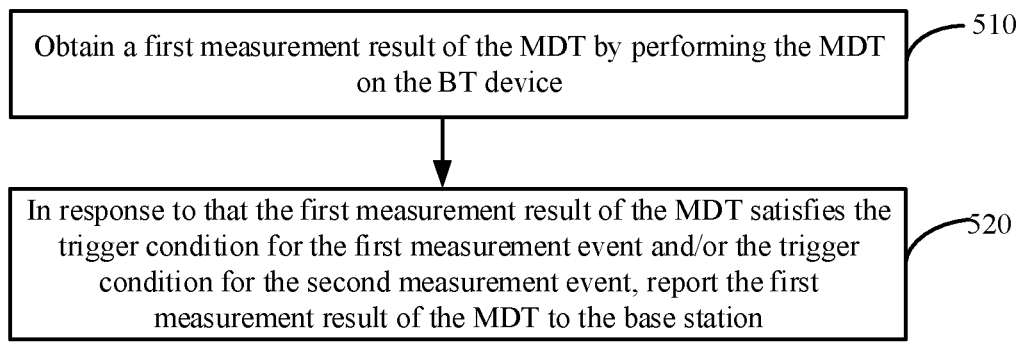
FIG. 5 is a flowchart of another method of configuring measurement according to an example.

FIG. 5 is a flowchart illustrating another method of configuring measurement according to an example. On the basis of the method shown in FIG. 4, the method of configuring measurement can be applied to a terminal, and the designated network device includes a BT device. A measurement event for the BT device includes a first measurement event and/or a second measurement event, a trigger condition for the first measurement event includes that BT signal strength is larger than a first threshold, and a trigger condition for the second measurement event includes that the BT signal strength is smaller than a second threshold. In addition, the trigger condition for the first measurement event further includes that duration of the BT signal strength being larger than the first threshold is first time, and the trigger condition for the second measurement event further includes that duration of the BT signal strength being smaller than the second threshold is second time. When step 440 is performed, as shown in FIG. 5, the following steps 510-520 can be included.

At step 510, a first measurement result of an MDT is obtained by performing the MDT on the BT device.

In the examples of the present disclosure, since the base station does not instruct the terminal to measure one or more designated BT devices, the terminal can perform the MDT on all BT devices which can be detected by the terminal.

At step 520, in response to that the first measurement result of the MDT satisfies the trigger condition for the first measurement event and/or the trigger condition for the second measurement event, the first measurement result of the MDT is reported to the base station.

In the examples of the present disclosure, the trigger condition for the measurement event with respect to the BT device can be a trigger condition for the terminal to report the measurement result of the MDT for the BT device.

For example, the terminal detects three BT devices, namely BT 1, BT 2 and BT 3, the terminal can perform the MDT on BT 1, BT 2 and BT 3 respectively, and measurement results of the MDTs for BT 1, BT 2 and BT 3 are obtained respectively. When at least one of the measurement result of the MDTs for BT 1, BT 2 and BT 3 satisfies the trigger condition for the first measurement event with respect to the BT device and/or the trigger condition for the second measurement event with respect to the BT device, each measurement result of the MDTs that satisfies the condition is reported to the base station.

As seen from the above example, the first measurement result of the MDT is obtained by performing the MDT on the BT device, and when the first measurement result of the MDT satisfies the trigger condition for the first measurement event and/or the trigger condition for the second measurement event, the first measurement result of the MDT is reported to the base station. In this way, the MDT is performed on the BT device and the measurement result is reported based on the configuration from the base station, thereby improving efficiency of reporting the measurement result of the BT device and saving resource overhead.

Figure 6:
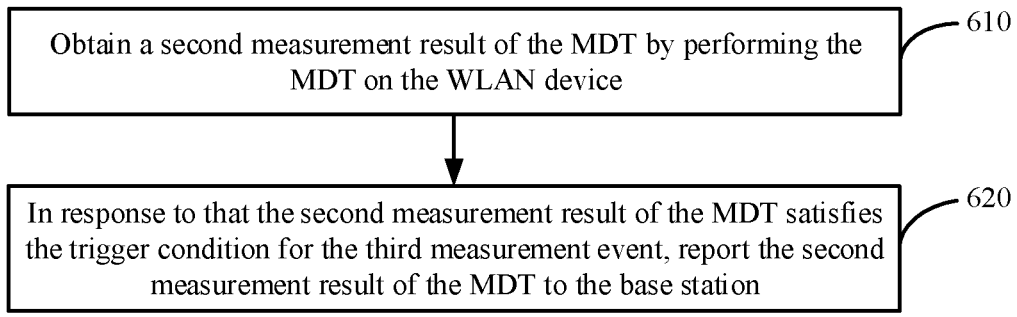
FIG. 6 is a flowchart illustrating another method of configuring measurement according to an example.

FIG. 6 is a flowchart illustrating another method of configuring measurement according to an example. On the basis of the method shown in FIG. 4, the method of configuring measurement can be applied to a terminal, and, the designated network device is a WLAN device. A measurement event for the WLAN device includes a third measurement event, a trigger condition for the third measurement event is that WLAN signal strength is smaller than a third threshold. When step 440 is performed, as shown in FIG. 6, the following steps 610-620 can be included.

At step 610, a second measurement result of an MDT is obtained by performing the MDT on the WLAN device.

In the examples of the present disclosure, the terminal can perform the MDT on all WLAN devices which can be detected by the terminal.

At step 620, in response to that the second measurement result of the MDT satisfies the trigger condition for the third measurement event, the second measurement result of the MDT is reported to the base station.

In the examples of the present disclosure, the trigger condition for the measurement event with respect to the WLAN device can be a trigger condition for the terminal to report the measurement result of the MDT for the WLAN device.

For example, the terminal detects three WLAN devices, namely WLAN 1, WLAN 2 and WLAN 3, the terminal can perform the MDT on WLAN 1, WLAN 2 and WLAN 3 respectively, and measurement results of the MDTs for WLAN 1, WLAN 2 and WLAN 3 are obtained respectively. When at least one of the measurement result of the MDT of WLAN 1, WLAN 2 and WLAN 3 satisfies the trigger condition for the third measurement event with respect to the WLAN device, each measurement result of the MDTs that satisfies the condition is reported to the base station.

As seen from the above example, the second measurement result of the MDT is obtained by performing the MDT on the WLAN device, and when the second measurement result of the MDT satisfies the trigger condition for the third measurement event, the second measurement result of the MDT is reported to the base station. In this way, the MDT is performed on the WLAN device and the measurement result is reported based on the configuration from the base station, thereby improving efficiency of reporting the measurement result of the WLAN device and saving resource overhead.

Figure 7:
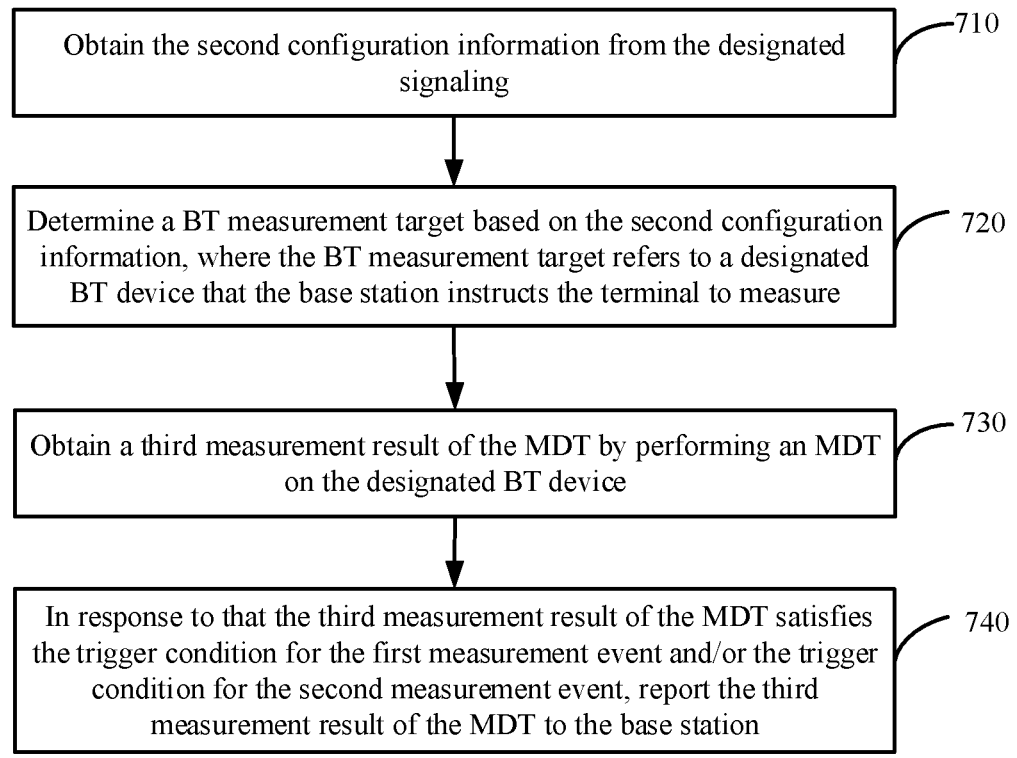
FIG. 7 is a flowchart illustrating another method of configuring measurement according to an example.

FIG. 7 is a flowchart illustrating another method of configuring measurement according to an example. On the basis of the method shown in FIG. 4, the method of configuring measurement can be applied to a terminal, and the designated network device includes a BT device. A measurement event for the BT device includes a first measurement event and/or a second measurement event, a trigger condition for the first measurement event includes that BT signal strength is larger than a first threshold, and a trigger condition for the second measurement event includes that the BT signal strength is smaller than a second threshold. In addition, the trigger condition for the first measurement event further includes that duration of the BT signal strength being larger than the first threshold is first time, and the trigger condition for the second measurement event further includes that duration of the BT signal strength being smaller than the second threshold is second time. Moreover, the BT device is specifically one or more designated BT devices that the base station instructs the terminal to measure, and the designated signaling further includes second configuration information, where the second configuration information represents the one or more designated BT devices. As shown in FIG. 7, when performing step 440, the following steps 710-740 can be included.

At step 710, the second configuration information is obtained from the designated signaling.

In the example of the present disclosure, the second configuration information may include names of the one or more BT devices, and these names of the BT devices are used to represent which designated BT devices the base station instructs the terminal to measure.

Alternatively, the second configuration information may include a type of the BT device, and the type of the BT device is used to represent which designated BT device the base station instructs the terminal to measure, for example, a BT device associated with China Mobile.

In addition, if the base station instructs one or more designated BT devices that the terminal needs to measure, the terminal only performs an MDT on the one or more designated BT devices. If the base station does not instruct one or more designated BT devices that the terminal needs to measure, the terminal can perform the MDT on all BT devices which can be detected by the terminal.

At step 720, a BT measurement target is determined based on the second configuration information, where the BT measurement target refers to a designated BT device that the base station instructs the terminal to measure.

At step 730, a third measurement result of the MDT is obtained by performing an MDT on the BT measurement target.

At step 740, in response to that the third measurement result of the MDT satisfies the trigger condition for the first measurement event and/or the trigger condition for the second measurement event, the third measurement result of the MDT is reported to the base station.

For example, the terminal detects three BT devices, namely BT 1, BT 2, and BT 3, where BT 2 and BT 3 are designated BT devices that the base station instructs the terminal to measure. The terminal can only perform the MDTs on BT 2 and BT 3, to obtain measurement results of the MDTs of BT 2 and BT 3. When at least one of the measurement result of the MDTs for BT 2 and BT 3 satisfies the trigger condition for the first measurement event with respect to the BT device and/or the trigger condition for the second measurement event with respect to the BT device, each measurement result of the MDTs that satisfies the condition is reported to the base station.

As seen from the above example, the second configuration information is obtained from the designated signaling. The BT measurement target is determined based on the second configuration information, where the BT measurement target refers to a designated BT device that the base station instructs the terminal to measure. The third measurement result of the MDT is obtained by performing an MDT on the BT measurement target. When the third measurement result of the MDT satisfies the trigger condition for the first measurement event and/or the trigger condition for the second measurement event, the third measurement result of the MDT is reported to the base station. In this way, accuracy of reporting a measurement result is improved.

Figure 8:
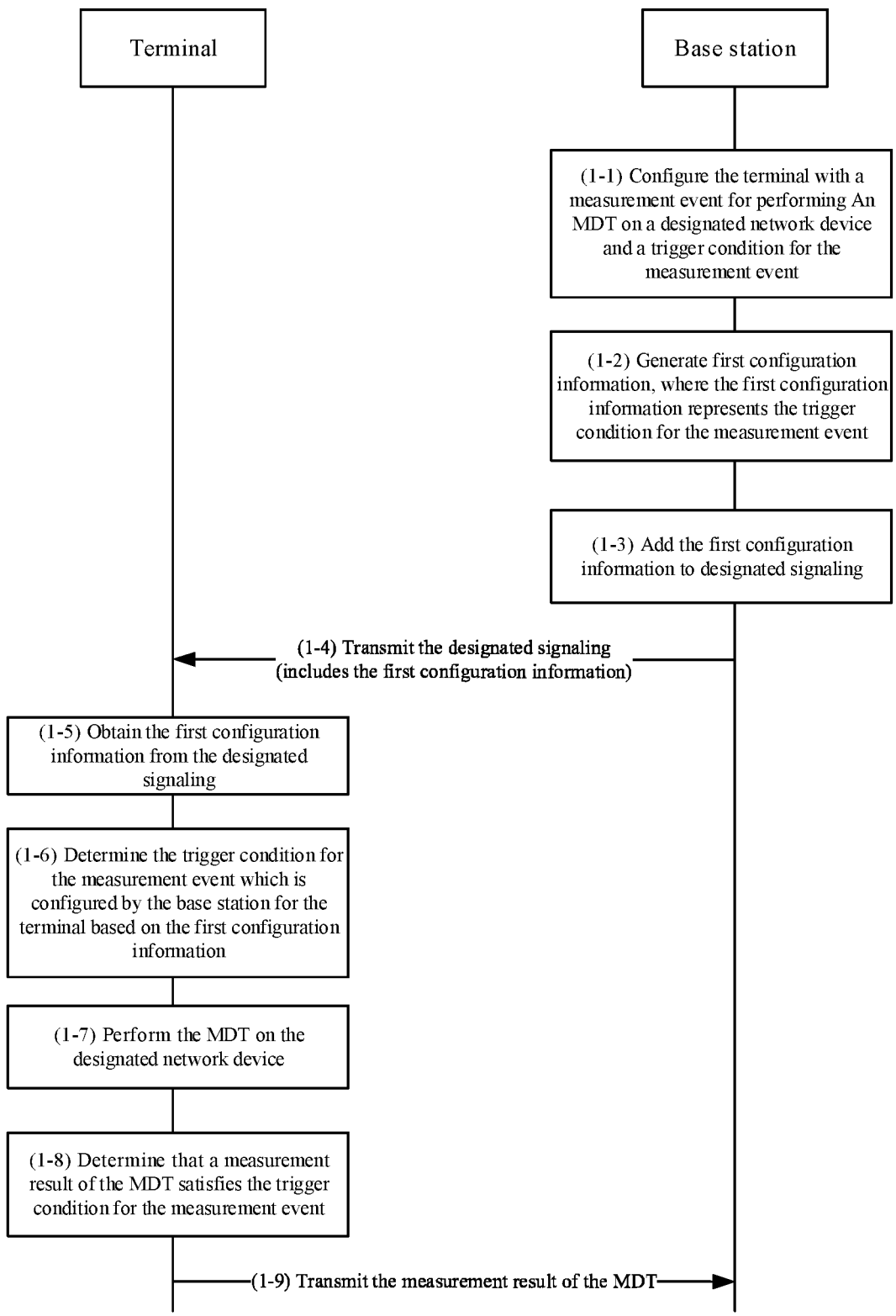
FIG. 8 is an information interaction diagram illustrating a method of configuring measurement according to an example.

FIG. 8 is an information interaction diagram illustrating a method of configuring measurement according to an example. As shown in FIG. 8, a terminal and a base station are included, and the information interaction process between the terminal and the base station is as follows.

(1-1) The base station configures the terminal with a measurement event for performing an MDT on a designated network device and a trigger condition for the measurement event. The designated network device can be a BT device and/or a WLAN device.

(1-2) The base station generates first configuration information, where the first configuration information represents the trigger condition for the measurement event with respect to the designated network device.

(1-3) The base station adds the first configuration information to designated signaling.

(1-4) The base station transmits the designated signaling to the terminal, where the designated signaling includes the first configuration information.

(1-5) The terminal obtains the first configuration information from the designated signaling.

(1-6) Based on the first configuration information, the terminal determines the trigger condition for the measurement event which is configured by the base station for the terminal.

(1-7) The terminal performs the MDT on the designated network device.

(1-8) The terminal determines that a measurement result of the MDT satisfies the trigger condition for the measurement event.

(1-9) The terminal transmits the measurement result of the MDT to the base station.

Figure 9:
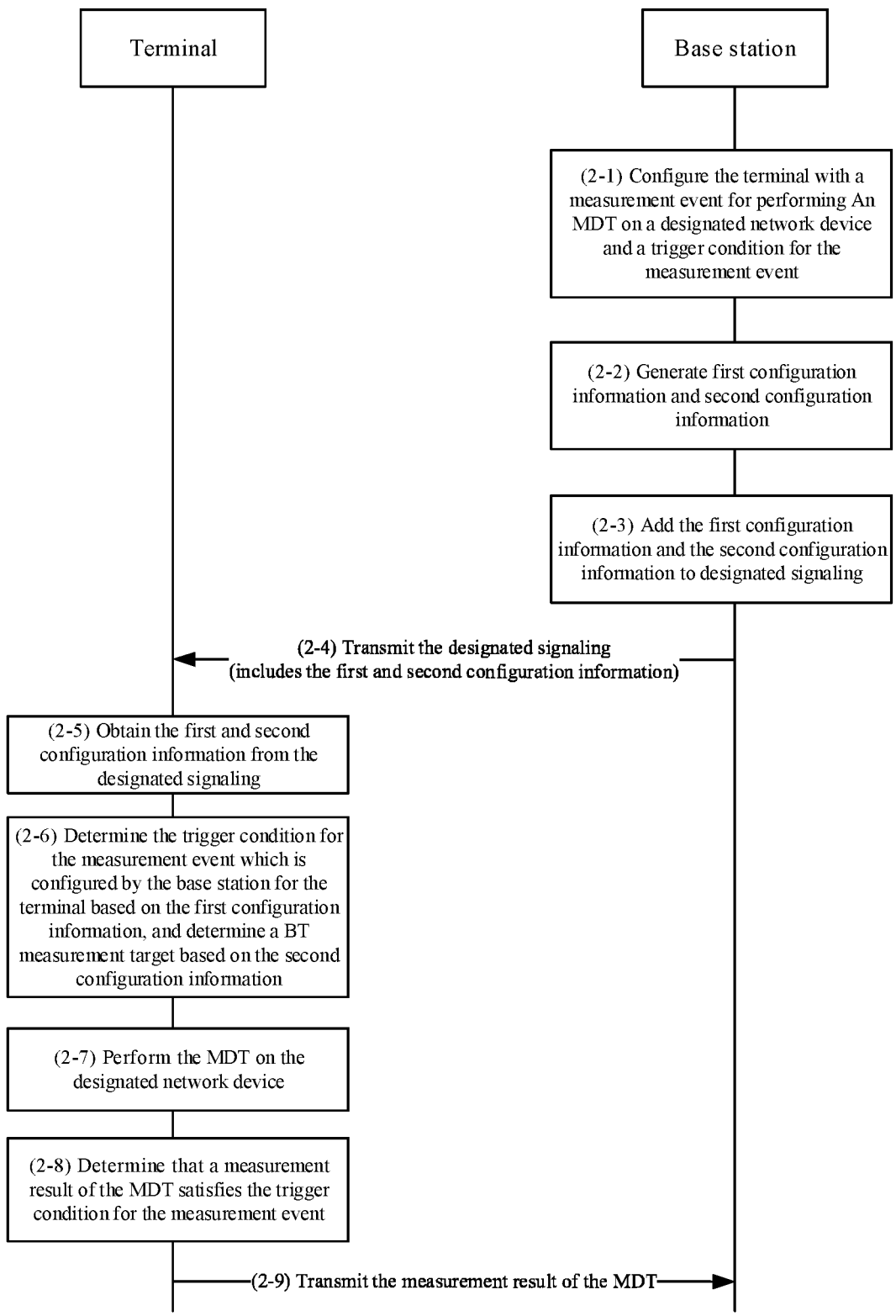
FIG. 9 is an information interaction diagram illustrating another method of configuring measurement according to an example.

FIG. 9 is an information interaction diagram illustrating another method of configuring measurement according to an example. As shown in FIG. 9, a terminal and a base station are included, and the information interaction process between the terminal and the base station is as follows.

(2-1) The base station configures the terminal with a measurement event for performing an MDT on a BT device and a trigger condition for the measurement event. The BT device is specifically one or more designated BT devices that the base station instructs the terminal to measure.

(2-2) The base station generates first configuration information and second configuration information, where the first configuration information represent the trigger condition for the measurement event with respect to the designated BT device, and the second configuration information represents the one or more designated BT devices that the base station instructs the terminal to measure.

(2-3) The base station adds the first configuration information and the second configuration information to designated signaling.

(2-4) The base station transmits the designated signaling to the terminal, and the designated signaling includes the first configuration information and the second configuration information.

(2-5) The terminal obtains the first configuration information and the second configuration information from the designated signaling.

(2-6) Based on the first configuration information, the terminal determines the trigger condition for the measurement event which is configured by the base station for the terminal, and determines a BT measurement target based on the second configuration information. The BT measurement target is a designated BT device that the base station instructs the terminal to measure.

(2-7) The terminal performs the MDT on the designated BT device.

(2-8) The terminal determines that a measurement result of the MDT satisfies the trigger condition for the measurement event.

(2-9) The terminal transmits the measurement result of the MDT to the base station.

Corresponding to the above examples of the method of configuring the measurement, the present disclosure also provides examples of an apparatus for configuring measurement.

Figure 10:
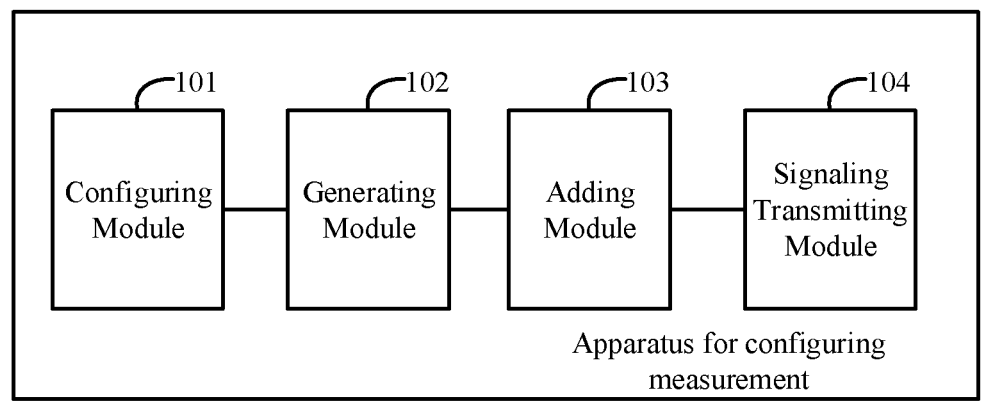
FIG. 10 is a block diagram illustrating an apparatus for configuring measurement according to an example.

FIG. 10 is a block diagram illustrating an apparatus for configuring measurement according to an example. The apparatus is applied to a base station and is configured to perform the method of configuring measurement shown in FIG. 1. As shown in FIG. 10, the apparatus for configuring measurement can include the following modules.

A configuring module 101 is configured to configure a terminal with a measurement event for performing an MDT on a designated network device and a trigger condition for the measurement event.

A generating module 102 is configured to generate first configuration information, where the first configuration information represents the trigger condition for the measurement event.

An adding module 103 is configured to add the first configuration information to designated signaling.

A signaling transmitting module 104 is configured to transmit the designated signaling to the terminal, such that the terminal performs the MDT on the designated network device, and in response to that a measurement result of the MDT satisfies the trigger condition for the measurement event, the measurement result of the MDT is reported to the base station.

As seen from the above examples, the terminal is configured with a measurement event for performing an MDT on a designated network device and a trigger condition for the measurement event; first configuration information representing the trigger condition for the measurement event with respect to the designated network device is generated; the first configuration information is added to designated signaling; and the designated signaling is transmitted to the terminal. In this way, the terminal performs the MDT on the designated network device, and when a measurement result of the MDT satisfies the trigger condition for the measurement event with respect to the designated network device, the measurement result of the MDT can be reported to the base station. Therefore, for the designated network device instructed by the base station, the MDT is preformed and the measurement result is report. Furthermore, practicality of configuring measurement is improved, and efficiency of reporting measurement results is improved.

In an example, on the basis of the apparatus shown in FIG. 10, the designated network device includes a BT device, a measurement event for the BT device includes a first measurement event and/or a second measurement event, a trigger condition for the first measurement event includes that BT signal strength is larger than a first threshold, and a trigger condition for the second measurement event includes that the BT signal strength is smaller than a second threshold.

Figure 11:
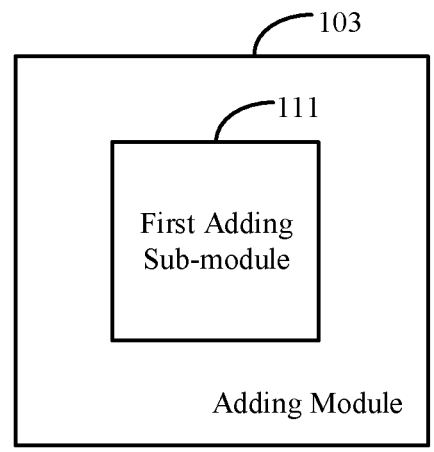
FIG. 11 is a block diagram illustrating another apparatus for configuring measurement according to an example.

In an example, on the basis of the apparatus shown in FIG. 10, the first configuration information includes the first threshold and/or the second threshold; as shown in FIG. 11, the adding module 103 can include:

a first adding sub-module 111 configured to add the first threshold and/or the second threshold to the designated signaling.

As seen from the above example, the designated network device can be a BT device, the trigger condition for the first measurement event is that the BT signal strength is larger than the first threshold, and the trigger condition for the second measurement event is that the BT signal strength is smaller than the second threshold. Thus, the terminal performs an MDT on the BT device, and when a measurement result of the MDT satisfies the trigger condition for the first measurement event and/or the trigger condition for the second measurement event, the terminal can report the measurement result of the MDT to the base station instead of reporting all measurement results of the MDTs to the base station, thereby improving efficiency of reporting the measurement result of the BT device and saving resource overhead.

In an example, on the basis of the apparatus shown in FIG. 10, the designated network device includes a BT device. A measurement event for the BT device includes a first measurement event and/or a second measurement event, a trigger condition for the first measurement event includes that BT signal strength is larger than a first threshold, and a trigger condition for the second measurement event includes that the BT signal strength is smaller than a second threshold. In addition, the trigger condition for the first measurement event further includes that duration of the BT signal strength being larger than the first threshold is first time, and the trigger condition for the second measurement event further includes that duration of the BT signal strength being smaller than the second threshold is second time.

Figure 12:
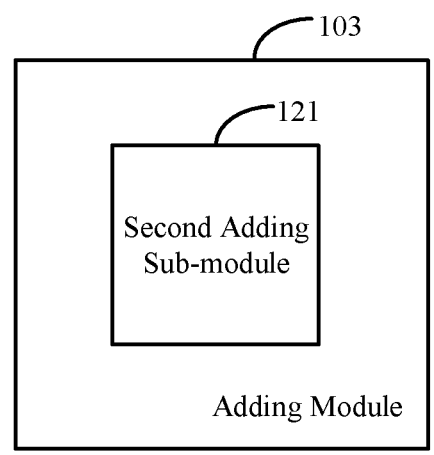
FIG. 12 is a block diagram illustrating another apparatus for configuring measurement according to an example.

In an example, on the basis of the apparatus shown in FIG. 10, the first configuration information includes the first threshold and the first time, and/or the second threshold and the second time; and as shown in FIG. 12, the adding module 103 can include:

a second adding sub-module 121 configured to add the first threshold and the first time to the designated signaling; and/or add the second threshold and the second time to the designated signaling.

As seen from the above example, the designated network device can be a BT device. The trigger condition for the first measurement event is that the BT signal strength is larger than the first threshold while the duration of the BT signal strength being larger than the first threshold is the first time. The trigger condition for the second measurement event is that the BT signal strength is smaller than the second threshold while the duration of the BT signal strength being smaller than the second threshold is the second time. In this way, the terminal performs an MDT on the BT device, and when a measurement result of the MDT satisfies the trigger condition for the first measurement event and/or the trigger condition for the second measurement event, the terminal can report the measurement result of the MDT to the base station, thereby improving accuracy of reporting the measurement result.

In an example, on the basis of the apparatus shown in FIG. 10, the designated network device includes a WLAN device, a measurement event for the WLAN device includes a third measurement event, and a trigger condition for the third measurement event includes that WLAN signal strength is smaller than a third threshold.

Figure 13:
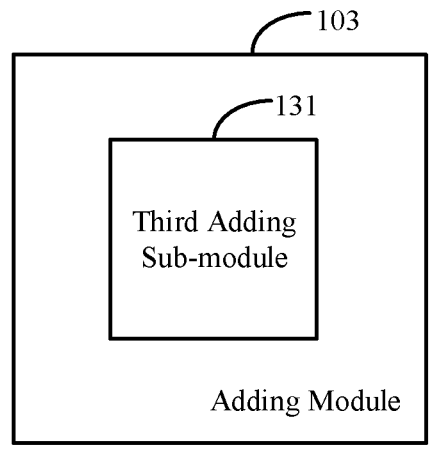
FIG. 13 is a block diagram illustrating another apparatus for configuring measurement according to an example.

In an example, on the basis of the apparatus shown in FIG. 10, the first configuration information includes a third threshold; and as shown in FIG. 13, the adding module 103 can include:

a third adding sub-module 131 configured to add the third threshold to the designated signaling.

As seen from the above example, the designated network device can be a WLAN device, and the trigger condition for the third measurement event is that the WLAN signal strength is smaller than the third threshold. Thus, the terminal can perform an MDT on the WLAN device, and when a measurement result of the MDT satisfies the third trigger condition for the measurement event, the terminal can report the measurement result of the MDT to the base station instead of reporting all measurement results of the MDTs to the base station, thereby improving efficiency of reporting the measurement result of the WLAN device and saving resource overhead.

In an example, on the basis of the apparatus shown in FIG. 10, the designated signaling includes RRC signaling or a reporting configuration inter-RAT signaling.

Figure 14:
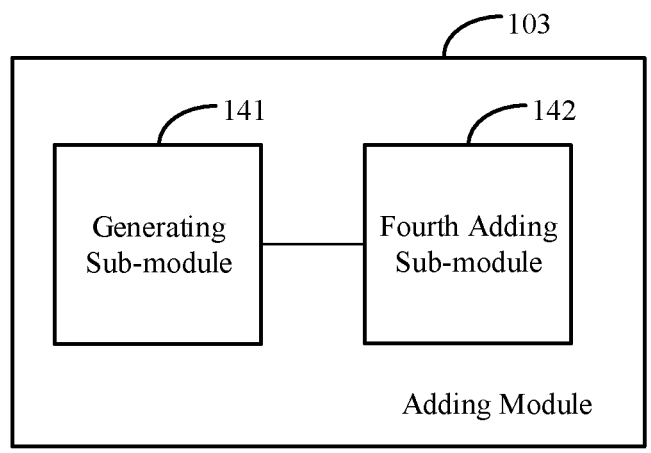
FIG. 14 is a block diagram illustrating another apparatus for configuring measurement according to an example.

In an example, on the basis of the apparatus shown in FIG. 10, the BT device includes one or more designated BT devices that the base station instructs the terminal to measure; and as shown in FIG. 14, the adding module 103 can include:

a generating sub-module 141 configured to generate second configuration information, where the second configuration information represents the one or more designated BT devices; and a fourth adding sub-module 142 configured to add the first configuration information and/or the second configuration information to the designated signaling.

As seen from the above example, the second configuration information is generated, where the second configuration information represents one or more designated BT devices that the base station instructs the terminal to measure, the first configuration information and the second configuration information are added to the designated signaling, and the designated signaling is transmitted to the terminal. In this way, the terminal can perform the MDT only on these designated BT devices, and when a measurement result of the MDT satisfies the trigger condition for the first measurement event and/or the trigger condition for the second measurement event, the terminal can report the measurement result of the MDT to the base station, thereby implementing the MDT and reporting the measurement result dedicated to the designated BT device instructed by the base station, and also improving accuracy of configuring measurement.

Figure 15:
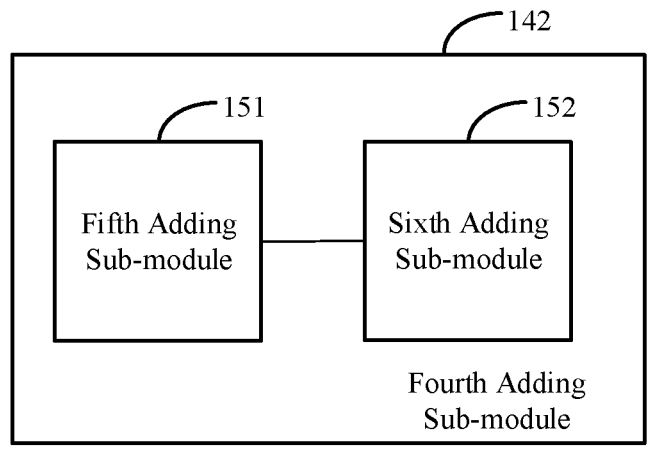
FIG. 15 is a block diagram illustrating another apparatus for configuring measurement according to an example.

In an example, on the basis of the apparatus shown in FIG. 14, as shown in FIG. 15, the fourth adding sub-module 142 can include:

a fifth adding sub-module 151 configured to add the second configuration information to BT measurement target signaling; and a sixth adding sub-module 152 configured to add the first configuration information and/or the BT measurement target signaling to measurement configuration RRC signaling, where the measurement configuration RRC signaling included in the designated signaling.

Figure 16:
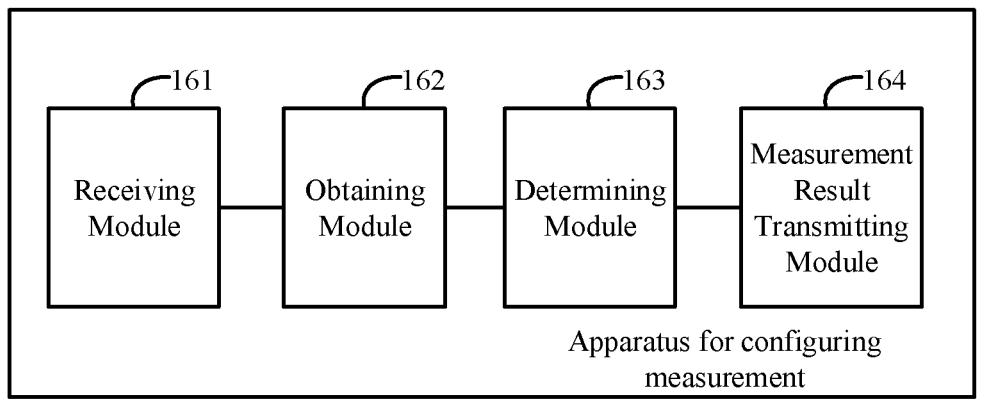
FIG. 16 is a block diagram illustrating an apparatus for configuring measurement according to an example.

FIG. 16 is a block diagram illustrating an apparatus for configuring measurement according to an example. The apparatus is applied to a terminal and configured to perform the method of configuring measurement shown in FIG. 4. As shown in FIG. 16, the apparatus for configuring measurement can include the following modules.

A receiving module 161 is configured to receive designated signaling from a base station, where the designated signaling includes first configuration information, and the first configuration information represents a trigger condition for a measurement event which is configured by the base station for the terminal to perform an MDT on a designated network device.

An obtaining module 162 is configured to obtain the first configuration information from the designated signaling.

A determining module 163 is configured to determine the trigger condition for the measurement event which is configured by the base station for the terminal based on the first configuration information.

A measurement result transmitting module 164 is configured to, in response to that the MDT is performed on the designated network device and a measurement result of the MDT satisfies the trigger condition for the measurement event, report the measurement result of the MDT to the base station.

As seen from the above example, a designated signaling from the base station is received, where the designated signaling includes first configuration information, and the first configuration information represents a trigger condition for a measurement event which is configured by the base station for the terminal to perform an MDT on a designated network device, the first configuration information is obtained from the designated signaling, and the trigger condition for the measurement event which is configured by the base station for the terminal is determined based on the first configuration information. In response to that an MDT is performed on the designated network device and a measurement result of the MDT satisfies the trigger condition for the measurement event, the measurement result of the MDT is reported to the base station. In this way, for the designated network device, the MDT is performed and the measurement result is reported based on the configuration from the base station. Therefore, for the designated network device instructed by the base station, the MDT is preformed and the measurement result is report. Furthermore, practicality of configuring measurement is improved, and efficiency of reporting measurement results is improved.

In an example, on the basis of the apparatus shown in FIG. 16, the designated network device includes a BT device, a measurement event for the BT device includes a first measurement event and/or a second measurement event, a trigger condition for the first measurement event includes that BT signal strength is larger than a first threshold, and a trigger condition for the second measurement event includes that the BT signal strength is smaller than a second threshold.

In an example, on the basis of the apparatus shown in FIG. 16, the trigger condition for the first measurement event further includes that duration of the BT signal strength being larger than the first threshold is first time, and the trigger condition for the second measurement event further includes that duration of the BT signal strength being smaller than the second threshold is second time.

Figure 17:
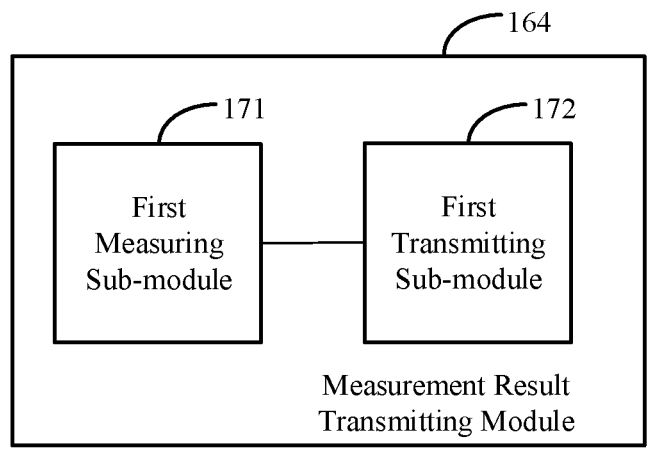
FIG. 17 is a block diagram illustrating another apparatus for configuring measurement according to an example.

In an example, on the basis of the apparatus shown in FIG. 16, as shown in FIG. 17, the measurement result transmitting module 164 includes:

a first measuring sub-module 171 configured to obtain a first measurement result of the MDT by performing the MDT on the BT device; and a first transmitting sub-module 172 configured to, in response to that the first measurement result of the MDT satisfies the trigger condition for the first measurement event and/or the trigger condition for the second measurement event, report the first measurement result of the MDT to the base station.

As seen from the above example, the first measurement result of the MDT is obtained by performing the MDT on the BT device, and when the first measurement result of the MDT satisfies the trigger condition for the first measurement event and/or the trigger condition for the second measurement event, the first measurement result of the MDT is reported to the base station. In this way, the MDT is performed on the BT device and the measurement result is reported based on the configuration from the base station, thereby improving efficiency of reporting the measurement result of the BT device and saving resource overhead.

Figure 18:
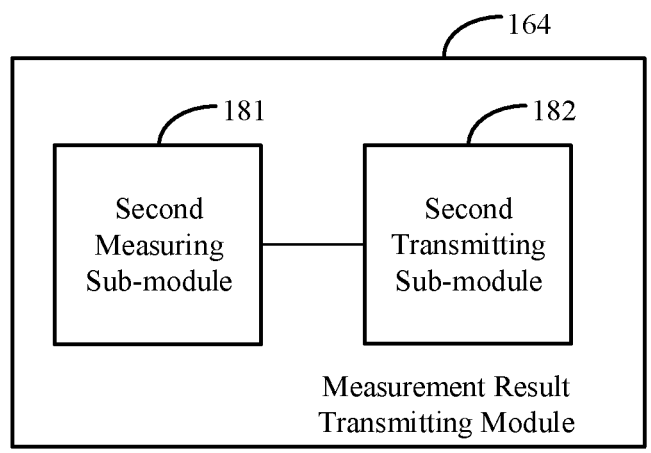
FIG. 18 is a block diagram illustrating another apparatus for configuring measurement according to an example.

In an example, on the basis of the apparatus shown in FIG. 16, the designated network device includes a WLAN device, a measurement event for the WLAN device includes a third measurement event, and a trigger condition for the third measurement event includes that WLAN signal strength is smaller than a third threshold. As shown in FIG. 18, the measurement result transmitting module 164 includes:

a second measuring sub-module 181 configured to obtain a second measurement result of the MDT by performing the MDT on the WLAN device; and a second transmitting sub-module 182 configured to, in response to that the second measurement result of the MDT satisfies the trigger condition for the third measurement event, report the second measurement result of the MDT to the base station.

As seen from the above example, the second measurement result of the MDT is obtained by performing the MDT on the WLAN device, and when the second measurement result of the MDT satisfies the trigger condition for the third measurement event, the second measurement result of the MDT is reported to the base station. In this way, the MDT is performed on the WLAN device and the measurement result is reported based on the configuration from the base station, thereby improving efficiency of reporting the measurement result of the WLAN device and saving resource overhead.

Figure 19:
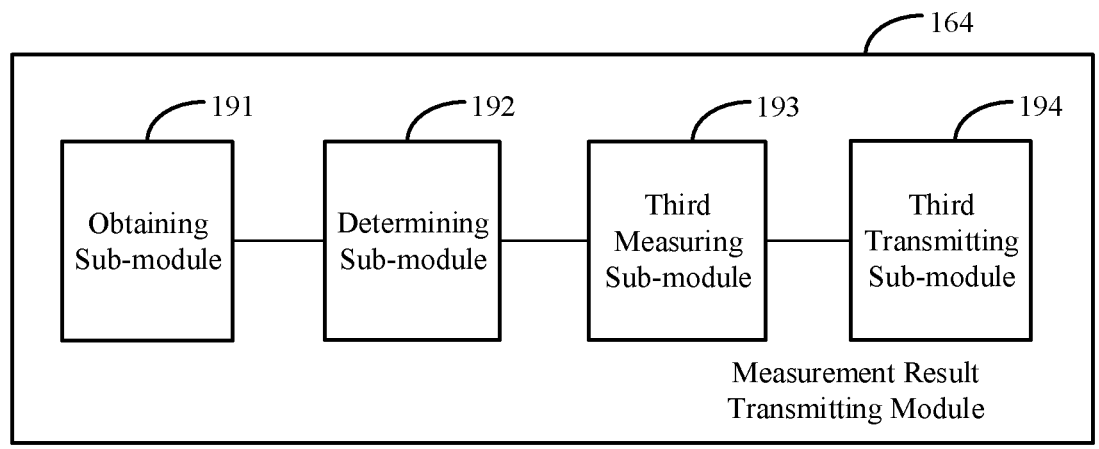
FIG. 19 is a block diagram illustrating another apparatus for configuring measurement according to an example.

In an example, on the basis of the apparatus shown in FIG. 16, the BT device includes one or more designated BT devices that the base station instructs the terminal to measure, the designated signaling further includes second configuration information, and the second configuration information represents the one or more designated BT devices. As shown in FIG. 19, the measurement result transmitting module 164 includes:

an obtaining sub-module 191 configured to obtain the second configuration information from the designated signaling;

a determining sub-module 192 configured to determine a BT measurement target based on the second configuration information, where the BT measurement target refers to the designated BT device;

a third measuring sub-module 193 configured to obtain a third measurement result of the MDT by performing the MDT on the BT measurement target; and a third transmitting sub-module 194 configured to, in response to that the third measurement result of the MDT satisfies the trigger condition for the first measurement event and/or the trigger condition for the second measurement event, report the third measurement result of the MDT to the base station.

As seen from the above example, the second configuration information is obtained from the designated signaling. The BT measurement target is determined based on the second configuration information, where the BT measurement target refers to a designated BT device that the base station instructs the terminal to measure. The third measurement result of the MDT is obtained by performing an MDT on the BT measurement target. When the third measurement result of the MDT satisfies the trigger condition for the first measurement event and/or the trigger condition for the second measurement event, the third measurement result of the MDT is reported to the base station. In this way, accuracy of reporting a measurement result is improved.

Since the apparatus examples substantially correspond to the method examples, a reference can be made to part of the descriptions of the method examples for the related part. The apparatus examples described above are merely illustrative, where the units described as separate members can be or not be physically separated, and the members displayed as units can be or not be physical units, i.e., can be located in one place, or can be distributed to a plurality of network units. Part or all of the modules can be selected according to actual requirements to implement the objectives of the solutions in the examples. Those of ordinary skill in the art can understand and carry out them without creative work.

The present disclosure also provides a non-transitory computer-readable storage medium on which a computer program is stored, and the computer program is configured to perform the method of configuring measurement described in any one of FIGS. 1 to 3.

The present disclosure also provides a non-transitory computer-readable storage medium on which a computer program is stored, and the computer program is configured to perform the method of configuring measurement described in any one of FIGS. 4 to 7 described above.

The present disclosure also provides an apparatus for configuring measurement. The apparatus is applied to a base station, and the apparatus includes:

a processor; and a memory for storing instructions executable by the processor, where the processor is configured to:

configure a terminal with a measurement event for performing an MDT on a designated network device and a trigger condition for the measurement event;

generate first configuration information, where the first configuration information represents the trigger condition for the measurement event;

add the first configuration information to designated signaling; and transmit the designated signaling to the terminal, such that the terminal performs the MDT on the designated network device, and in response to that a measurement result of the MDT satisfies the trigger condition for the measurement event, the measurement result of the MDT is reported to the base station.

Figure 20:
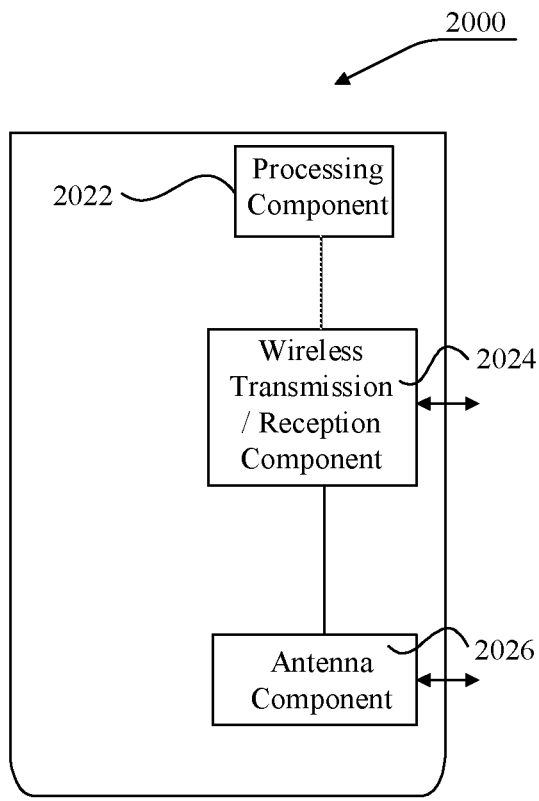
FIG. 20 is a schematic structural diagram illustrating an apparatus for configuring measurement according to an example.

FIG. 20 is a schematic structural diagram illustrating an apparatus for configuring measurement according to an example. An apparatus 2000 can be provided as a base station. Referring to FIG. 20, the apparatus 2000 includes a processing component 2022, a wireless transmission/reception component 2024, an antenna component 2026, and a signal processing part dedicated to the wireless interface. The processing component 2022 may further include one or more processors.

One of the processors of the processing component 2022 can be configured to perform any of the method of configuring measurement.

The present disclosure also provides an apparatus for configuring measurement, which is applied to a terminal. The apparatus includes:

a processor; and a memory for storing instructions executable by the processor, where the processor is configured to:

receive designated signaling from a base station, wherein the designated signaling comprises first configuration information, and the first configuration information represents a trigger condition for a measurement event which is configured by the base station for the terminal to perform an MDT on a designated network device;

obtain the first configuration information from the designated signaling;

determine the trigger condition for the measurement event which is configured by the base station for the terminal based on the first configuration information; and in response to that the MDT is performed on the designated network device and a measurement result of the MDT satisfies the trigger condition for the measurement event, report the measurement result of the MDT to the base station.

Figure 21:
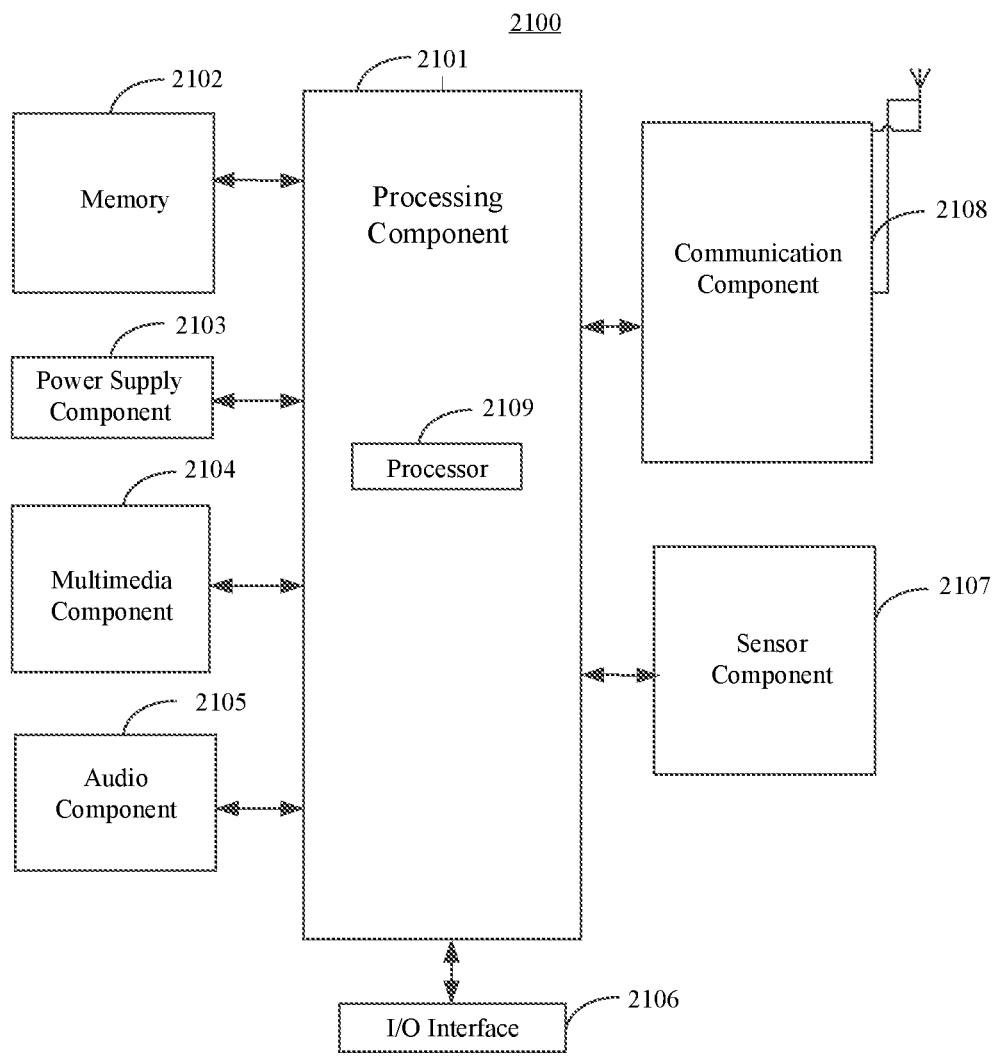
FIG. 21 is a schematic structural diagram illustrating an apparatus for configuring measurement according to an example.

FIG. 21 is a block diagram illustrating a structure of an apparatus for configuring measurement according to an example. As shown in FIG. 21, an apparatus for configuring measurement 2100 is illustrated according to an example, and the apparatus 2100 may be a terminal such as a computer, a mobile phone, a digital broadcasting terminal, a messaging device, a game console, a tablet device, a medical device, fitness equipment, a personal digital assistant, or the like.

As shown in FIG. 21, the apparatus 2100 may include one or more of the following components: a processing component 2101, a memory 2102, a power supply component 2103, a multimedia component 2104, an audio component 2105, an input/output (I/O) interface 2106, a sensor component 2107, and a communication component 2108.

The processing component 2101 generally controls overall operations of the apparatus 2100, such as operations associated with display, phone calls, data communications, camera operations, and recording operations. The processing component 2101 may include one or more processors 2109 to execute instructions to complete all or part of the steps of the above methods. In addition, the processing component 2101 may include one or more modules which facilitate the interaction between the processing component 2101 and other components. For example, the processing component 2101 may include a multimedia module to facilitate the interaction between the multimedia component 2104 and the processing component 2101.

The memory 2102 is to store various types of data to support the operation of the apparatus 2100. Examples of such data include instructions for any application or method operated on the apparatus 2100, contact data, phonebook data, messages, pictures, videos, and so on. The memory 2102 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2103 supplies power for different components of the apparatus 2100. The power supply component 2103 may include a power supply management system, one or more power supplies, and other components associated with generating, managing and distributing power for the apparatus 2100.

The multimedia component 2104 includes a screen providing an output interface between the apparatus 2100 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 2104 may include a front camera and/or a rear camera. The front camera and/or rear camera may receive external multimedia data when the apparatus 2100 is in an operating mode, such as a photographing mode or a video mode. Each of the front camera and the rear camera may be a fixed optical lens system or have focal length and optical zooming capability.

The audio component 2105 is to output and/or input an audio signal. For example, the audio component 2105 includes a microphone (MIC). When the apparatus 2100 is in an operating mode, such as a call mode, a record mode and a voice recognition mode, the microphone is to receive an external audio signal. The received audio signal may be further stored in the memory 2102 or sent via the communication component 2108. In some examples, the audio component 2105 further includes a speaker for outputting an audio signal.

The I/O interface 2106 provides an interface between the processing component 2101 and a peripheral interface module. The above peripheral interface module may be a keyboard, a click wheel, buttons, or the like. These buttons may include but not limited to, a home button, a volume button, a start button and a lock button.

The sensor component 2107 includes one or more sensors to provide status assessments of various aspects for the apparatus 2100. For example, the sensor component 2107 may detect the on/off status of the apparatus 2100, and relative positioning of component, for example, the component is a display and a keypad of the apparatus 2100. The sensor component 2107 may also detect a change in position of the apparatus 2100 or a component of the apparatus 2100, a presence or absence of the contact between a user and the apparatus 2100, an orientation or an acceleration/deceleration of the apparatus 2100, and a change in temperature of the apparatus 2100. The sensor component 2107 may include a proximity sensor to detect the presence of a nearby object without any physical contact. The sensor component 2107 may further include an optical sensor, such as a Complementary Metal-Oxide-Semiconductor (CMOS) or Charged Coupled Device (CCD) image sensor which is used in imaging applications. In some examples, the sensor component 2107 may further include an acceleration sensor, a gyroscope sensor, a magnetic sensor, a pressure sensor, or a temperature sensor.

The communication component 2108 is to facilitate wired or wireless communication between the apparatus 2100 and other devices. The apparatus 2100 may access a wireless network based on a communication standard, such as Wi-Fi, 2G or 3G, or a combination thereof. In an example, the communication component 2108 receives a broadcast signal or broadcast related information from an external broadcast management system via a broadcast channel. In an example, the communication component 2108 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Blue Tooth® (BT) technology and other technologies.

In an example, the apparatus 2100 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is further provided a non-transitory computer readable storage medium including instructions, such as the memory 2102 including instructions. The above instructions may be executed by the processor 2109 of the apparatus 2100 to complete the above method. For example, the non-transitory computer readable storage medium may be a Read-Only Memory (ROM), a Random Access Memory (RAM), a CD-ROM, a magnetic tape, a floppy disk, an optical data storage device, and so on.

When instructions in the storage medium are executed by the processor, the device 2100 can execute any one of the methods of configuring measurement described above.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes can be made without departing from the scope thereof. The scope of the present disclosure is limited only by the appended claims.

What is claimed is:

1. A method of configuring measurement, comprising:
configuring, by a base station, a terminal with a measurement event for performing a minimization of drive test (MDT) on a designated network device and a trigger condition for the measurement event, wherein the designated network device comprises a Bluetooth (BT) device, a measurement event for the BT device comprises at least one of following events: a first measurement event, or a second measurement event, a trigger condition for the first measurement event comprises that BT signal strength is larger than a first threshold, and a trigger condition for the second measurement event comprises that the BT signal strength is smaller than a second threshold;

generating, by the base station, first configuration information, wherein the first configuration information represents the trigger condition for the measurement event;

adding, by the base station, the first configuration information to designated signaling; and transmitting, by the base station, the designated signaling to the terminal, the designated signaling to the terminal instructing the terminal to perform the MDT on the designated network device, and wherein the terminal reports the measurement result of the MDT to the base station in response to a determination that a measurement result of the MDT satisfies the trigger condition for the measurement event.

2. The method according to claim 1, wherein the first configuration information comprises at least one of following thresholds: the first threshold or the second threshold; and adding the first configuration information to the designated signaling comprises at least one of followings:
adding the first threshold to the designated signaling; or
adding the second threshold to the designated signaling.

3. The method according to claim 1, wherein the trigger condition for the first measurement event further comprises that duration of the BT signal strength being larger than the first threshold is first time, and the trigger condition for the second measurement event further comprises that duration of the BT signal strength being smaller than the second threshold is second time.

4. The method according to claim 3, wherein the first configuration information comprises at least one of following parameters: the first threshold and the first time, or the second threshold and the second time; and adding the first configuration information to the designated signaling comprises at least one of followings:
adding the first threshold and the first time to the designated signaling; or
adding the second threshold and the second time to the designated signaling.

5. The method according to claim 1, wherein
the designated network device further comprises a wireless local area network (WLAN) device,
a measurement event for the WLAN device comprises a third measurement event, and
a trigger condition for the third measurement event comprises that WLAN signal strength is smaller than a third threshold.

6. The method according to claim 5, wherein the first configuration information comprises the third threshold; and
adding the first configuration information to the designated signaling comprises:
adding the third threshold to the designated signaling.

7. The method according to claim 1, wherein the designated signaling comprises one of following signaling: radio resource control (RRC) signaling or reporting configuration inter-radio access technology (RAT) signaling.

8. The method according to claim 1, wherein the BT device comprises one or more designated BT devices that the base station instructs the terminal to measure; and
adding the first configuration information to the designated signaling comprises:

generating second configuration information, wherein the second configuration information represents the one or more designated BT devices; and
adding to the designated signaling at least one of following information: the first configuration information, or the second configuration information.

9. The method according to claim 8, wherein adding to the designated signaling at least one of following information: the first configuration information, or the second configuration information comprises:
adding the second configuration information to BT measurement target signaling; and
adding to measurement configuration RRC signaling at least one of followings: the first configuration information, or the BT measurement target signaling, wherein the designated signaling comprises the measurement configuration RRC signaling.

10. A method of configuring measurement, comprising:
receiving, by a terminal, designated signaling from a base station, wherein the designated signaling comprises first configuration information, and the first configuration information represents a trigger condition for a measurement event configured by the base station for the terminal to perform a minimization of drive test (MDT) on a designated network device, wherein the designated network device comprises a wireless local area network (WLAN) device, a measurement event for the WLAN device comprises a third measurement event, and a trigger condition for the third measurement event comprises that WLAN signal strength is smaller than a third threshold;
obtaining, by the terminal, the first configuration information from the designated signaling;
determining, by the terminal, the trigger condition for the measurement event configured by the base station for the terminal based on the first configuration information; and
in response to determining that the MDT is performed on the designated network device and a measurement result of the MDT satisfies the trigger condition for the measurement event, reporting, by the terminal, the measurement result of the MDT to the base station;
wherein in response to determining that the MDT is performed on the designated network device and the measurement result of the MDT satisfies the trigger condition for the measurement event, reporting the measurement result of the MDT to the base station comprises:
obtaining a second measurement result of the MDT by performing the MDT on the WLAN device; and
in response to determining that the second measurement result of the MDT satisfies the trigger condition for the third measurement event, reporting the second measurement result of the MDT to the base station.

11. The method according to claim 10, wherein
the designated network device further comprises a Bluetooth (BT) device,
a measurement event for the BT device comprises at least one of following events: a first measurement event, or a second measurement event,
a trigger condition for the first measurement event comprises that BT signal strength is larger than a first threshold, and
a trigger condition for the second measurement event comprises that the BT signal strength is smaller than a second threshold.

12. The method according to claim 11, wherein the trigger condition for the first measurement event further comprises that duration of the BT signal strength being larger than the first threshold is first time, and the trigger condition for the second measurement event further comprises that duration of the BT signal strength being smaller than the second threshold is second time.

13. The method according to claim 11, wherein in response to determining that the MDT is performed on the designated network device and the measurement result of the MDT satisfies the trigger condition for the measurement event, reporting the measurement result of the MDT to the base station comprises:
  obtaining a first measurement result of the MDT by performing the MDT on the BT device; and
  in response to determining that the first measurement result of the MDT satisfies at least one of following trigger conditions: the trigger condition for the first measurement event, or the trigger condition for the second measurement event, reporting the first measurement result of the MDT to the base station.

14. The method according to claim 11, wherein the BT device comprises one or more designated BT devices that the base station instructs the terminal to measure, the designated signaling further comprises second configuration information, and the second configuration information represents the one or more designated BT devices; and
  in response to determining that the MDT is performed on the designated network device and the measurement result of the MDT satisfies the trigger condition for the measurement event, reporting the measurement result of the MDT to the base station comprises:
    obtaining the second configuration information from the designated signaling;
    determining a BT measurement target based on the second configuration information, wherein the BT measurement target refers to the one or more designated BT devices;
    obtaining a third measurement result of the MDT by performing the MDT on the BT measurement target; and
    in response to determining that the third measurement result of the MDT satisfies at least one of following trigger conditions: the trigger condition for the first measurement event, or the trigger condition for the second measurement event, reporting the third measurement result of the MDT to the base station.

15. A base station, comprising:
a processor;
a non-transitory storage coupled to the processor; and
a plurality of programs stored in the non-transitory storage that, when executed by the processor, cause the base station to perform acts comprising:
  configuring a terminal with a measurement event for performing a minimization of drive test (MDT) on a designated network device and a trigger condition for the measurement eventm wherein the designated network device comprises a Bluetooth (BT) device, a measurement event for the BT device comprises at least one of following events: a first measurement event, or a second measurement event, a trigger condition for the first measurement event comprises that BT signal strength is larger than a first threshold, and a trigger condition for the second measurement event comprises that the BT signal strength is smaller than a second threshold;
  generating first configuration information, wherein the first configuration information represents the trigger condition for the measurement event;
  adding the first configuration information to designated signaling; and
  transmitting the designated signaling to the terminal, such that the terminal performs the MDT on the designated network device, and in response to a determination that a measurement result of the MDT satisfies the trigger condition for the measurement event, the measurement result of the MDT is reported to the base station.

16. A terminal, comprising:
a processor;
a non-transitory storage coupled to the processor; and
a plurality of programs stored in the non-transitory storage that, when executed by the processor, cause the terminal to perform acts comprising:
  receiving designated signaling from a base station, wherein the designated signaling comprises first configuration information, and the first configuration information represents a trigger condition for a measurement event configured by the base station for the terminal to perform a minimization of drive test (MDT) on a designated network device, wherein the designated network device comprises a wireless local area network (WLAN) device, a measurement event for the WLAN device comprises a third measurement event, and a trigger condition for the third measurement event comprises that WLAN signal strength is smaller than a third threshold;
  obtaining the first configuration information from the designated signaling;
  determining the trigger condition for the measurement event configured by the base station for the terminal based on the first configuration information; and
  in response to determining that MDT is performed on the designated network device and a measurement result of the MDT satisfies the trigger condition for the measurement event, reporting the measurement result of the MDT to the base station;
  wherein in response to determining that the MDT is performed on the designated network device and the measurement result of the MDT satisfies the trigger condition for the measurement event, reporting the measurement result of the MDT to the base station comprises:
    obtaining a second measurement result of the MDT by performing the MDT on the WLAN device; and
    in response to determining that the second measurement result of the MDT satisfies the trigger condition for the third measurement event, reporting the second measurement result of the MDT to the base station.

17. The terminal according to claim 16, wherein
the designated network device further comprises a Bluetooth (BT) device,
a measurement event for the BT device comprises at least one of following events: a first measurement event, or a second measurement event,
a trigger condition for the first measurement event comprises that BT signal strength is larger than a first threshold, and
a trigger condition for the second measurement event comprises that the BT signal strength is smaller than a second threshold.

18. The base station according to claim 15, wherein
the designated network device further comprises a wireless local area network (WLAN) device,
a measurement event for the WLAN device comprises a third measurement event, and
a trigger condition for the third measurement event comprises that WLAN signal strength is smaller than a third threshold.

* * * * *